United States Patent [19]

Kozma

[11] Patent Number: 4,790,657
[45] Date of Patent: Dec. 13, 1988

[54] RING LASER GYROSCOPE CURVED BLADE FLEXURE AND SUPPORT RING ASSEMBLY AND METHOD

[75] Inventor: William Kozma, Calabassas, Calif.

[73] Assignee: Litton Systems, Inc., Beverly Hills, Calif.

[21] Appl. No.: 840,893

[22] Filed: Mar. 18, 1986

[51] Int. Cl.[4] ............................................. G01C 19/64
[52] U.S. Cl. ..................................................... 356/350
[58] Field of Search ......................................... 356/350

[56] References Cited

U.S. PATENT DOCUMENTS

| | | | |
|---|---|---|---|
| 4,309,107 | 1/1982 | McNair et al. | 356/350 |
| 4,314,174 | 2/1982 | Wing et al. | 310/315 |
| 4,321,557 | 3/1982 | McNair | 372/33 |
| 4,349,183 | 9/1982 | Wirt et al. | 267/160 |
| 4,436,423 | 3/1984 | Kumar et al. | 356/350 |
| 4,634,091 | 1/1987 | Butler | 356/350 |

FOREIGN PATENT DOCUMENTS

EP0128230A1  6/1983  Fed. Rep. of Germany .

Primary Examiner—Vincent P. McGraw
Assistant Examiner—S. A. Turner
Attorney, Agent, or Firm—John H. Lynn

[57] ABSTRACT

A dither flexure for a ring laser gyroscope includes a central portion and a plurality of curved vanes extending therefrom to connect to a flexure ring. The flexure ring includes a boss in a central portion thereof. A glass ceramic ring having a pair of end bosses is bonded to the boss around the flexure ring with the end bosses facing outward toward the ring laser gyroscope frame. The end bosses contact the ring laser gyroscope frame so that a void is formed opposite the flexure ring boss, which prevents transmission of radially directed stresses from the dither flexure to the frame. The curved blades have high resistance to off-axis vibrations and have high off-axis resonant frequencies so that very little coning and axis sag occur. Each blade has a curved portion and a straight portion, which provides a convenient location for mounting piezoelectric drive elements for dithering the ring laser gyroscope.

30 Claims, 5 Drawing Sheets

RING LASER GYROSCOPE CURVED BLADE FLEXURE AND SUPPORT RING ASSEMBLY AND METHOD

BACKGROUND OF THE INVENTION

This invention relates generally to rotation sensors and particularly to ring laser gyroscope rotation sensors. Still more particularly, this invention relates to apparatus and methods for supporting a ring laser gyroscope frame to allow rotational motion about the input axis of the ring laser gyroscope to reduce the effects of lock-in and to provide extremely high stiffness for all other degrees of freedom to reduce coning errors.

A ring laser gyroscope employs the Sagnac effect to detect rotation. Two counterpropagating light beams in a closed loop will have transit times that differ in direct proportion to the rotation rate of the loop about an axis perpendicular to the plane of the loop. There are in general two basic techniques for utilizing the Sagnac effect to detect rotations. A first technique is the interferometric approach, which involves measuring the differential phase shift between two counterpropagating beams injected from an external source, typically a laser, into a Sagnac ring. The ring may be defined by mirrors that direct the light beams around the path or by a coil of optical fiber. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

The ring laser gyroscope uses the resonant properties of a closed cavity to convert the Sagnac phase difference between the counter propagating beams into a frequency difference. The high optical frequencies of about $10^{15}$ Hz for light used in ring laser gyroscopes cause the minute phase changes to become beat frequencies that are readily measured.

A ring laser gyroscope has a sensor axis that passes through the closed paths traversed by the counterpropagating beams. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling opposite in direction to the rotation decreases.

Ring laser gyroscopes may be classified as passive or active, depending upon whether the lasing, or gain, medium is external or internal to the cavity. In the active ring laser gyroscope the cavity defined by the closed optical path becomes an oscillator, and output beams from the two directions beat together to give a beat frequency that is a measure of the rotation rate. The oscillator approach means that the frequency filtering properties of the cavity resonator are narrowed by many orders of magnitude below the passive cavity and give very precise rotation sensing potential. To date the major ring laser gyroscope rotation sensor effort has been put into the active ring laser. Presently all commercially available optical rotation sensors are active ring laser gyroscopes.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates the ring laser gyroscope produces a false indication that the device is not rotating. If the rotation rate of a ring laser gyroscope starts at a value above that where lock-in occurs and is then decreased, the frequency difference between the beams disappears at a certain input rotation rate. This input rotation rate is called the lock-in threshold and may be denoted $\Omega_L$. The range of rotation rates over which lock-in occurs is the deadband of the ring laser gyroscope.

Lock-in is believed to arise from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

Upon reversal of the sign of the frequency difference between the two beams, there is a tendency for the beams to lock-in since at some point the frequency difference is zero. Since the output of the ring laser gyroscope is derived from the frequency difference, an error accumulates in the output angle. The periods in which the two beams are locked in are usually very short in duration, the error is very small. However, since the error is cumulative, in time the error can become appreciable in precision navigation systems. This error is called random walk or random drift.

In addition to causing erroneous rotation rate information to be output from a ring laser gyroscope, lock-in causes standing waves to appear on the mirror surfaces. These standing waves may create a grating of high and low absorption regions, which create localized losses that increase the coupling between the beams and the lock-in. The mirrors may be permanently distorted by leaving a ring laser gyroscope operating in a lock-in condition.

Any inability to accurately measure low rotation rates reduces the effectiveness of a ring laser gyroscope in navigational systems. There has been substantial amount of research and development work to reduce or eliminate the effects of lock-in to enhance the effective use of ring laser gyroscopes in such systems.

There are several known approaches to solving the problems of lock-in. One such approach involves mechanically oscillating the ring laser gyroscope about its sensor axis so that the device is constantly sweeping through the deadband and is never locked therein. This mechanical oscillation of the ring laser gyroscope is usually called dithering. A typical ring laser gyroscope may be dithered at about 400 Hz with an angular displacement of a few arc minutes.

Mechanical dithering is accomplished by mounting the ring laser gyroscope frame on a flexure device that includes a plurality of vanes or blades extending from a central portion. Each blade has a pair of piezoelectric elements mounted on opposite sides thereof. Voltages are applied to the piezoelectric elements such that one piezoelectric element on each blade increases in length while the other piezoelectric element decreases in length. The effect of these length changes in the piezoelectric elements is transmitted to the blades through the mounting of the piezoelectric elements thereon.

Increasing the length of one side of each blade while shortening the other side causes the blades to flex or bend so that each blade experiences a small rotation about the ring laser gyroscope axis. The voltage is oscillatory so that the blades are constantly vibrating in phase, and the ring laser gyroscope frame mounted to the blades rotates about the axis.

Body dither must be accomplished so that dither oscillations cause the ring laser gyroscope frame to rotate only about the sensing axis. Any small component of rotation about other axes causes the sensing axis to precess in a cone-shaped path about the direction it should point. This motion of the axis is called coning. Any change in the direction of the axis due to dithering introduces errors into the output of the ring laser gyroscope. Since a navigation system includes three ring laser gyroscopes mounted in an instrument block with the sensing axes being mutually orthogonal, mechanical coupling of the dither oscillations is likely.

To reduce coning, the plane of oscillation of the flexure is aligned perpendicular to the sensing axis, and the axis of the dither is collinear with the sensing axis to very close tolerances. To further minimize oscillations about other axes, the dither flexure should be as rigid as possible to resist any tendency to oscillate about other axes. Since all mechanical systems have natural frequencies of oscillation, there will in general be some small amount of oscillation about other axes. Typical prior art dither flexures have rotational and translational resonant frequencies below 1000 Hz and have relatively high compliances, which, when combined with relatively low coning frequencies, lead to large system bias errors. These compliant flexures allow a relatively large amplitude frame input axis motion, which couples with system block motion to cause angle errors that cannot be software compensated.

U.S. Pat. No. 4,115,004 to Hutchings et al., assignor to Litton Systems, Inc., assignee of the present invention, discloses a dual spring system that mounts a counterweight to the ring laser gyroscope case to reduce oscillatory motion of the case due to oscillation of the gyroscope. This dual spring system includes a first set of springs mounted between the case and the gyroscope and a second set of springs mounted between the case and the counterweight.

U.S. Pat. No. 4,309,107 to McNair et al., assignor to Litton Systems, Inc., discloses a ring laser gyroscope dither mechanism for isolating vibrational energy generated by dithering the gyroscope and prevents that energy from passing to the mounting case of the gyroscope. McNair et al. discloses a three spring system mounting a gyroscope to a housing or case, mounting a counterweight to the gyroscope and mounting the counterweight to the case. This arrangement reduces the amount of angular vibrational energy that passes to the case of the gyroscope by using the counterweight to provide a reaction to the oscillations within the gyroscope caused by mechanically dithering to prevent lock-in.

U.S. Pat. No. 4,321,557 to McNair, assignor to Litton Systems, Inc., discloses a ring laser gyroscope coupling system in which a pair of resilient rings are located between a plate attached to the laser dither suspension mechanism and the lower surface of the case of the ring laser gyroscope to form a reservoir for a viscous fluid. The viscous fluid reduces transmission of thermal stresses between the case and the dither suspension mechanism.

U.S. Pat. No. 4,349,183 to Wirt et al., assignor to Litton Systems, Inc., discloses a spring flexure assembly for a ring laser gyroscope dithering mechanism. The assembly includes a plurality of flexure springs radially extending between a hub and a rim with each spring being driven by four piezoelectric wafers. Each spring has a reduced moment of inertia about an axis parallel to the common axis of the rim and hub and an increased circumferential bending in the region of attachment to the rim.

U.S. Pat. No. 3,464,657 to Bullard discloses a single set of springs connected between the frame and mounting platform of an aircraft instrument to isolate vibrational energy from the instrument.

U.S. Pat. No. 3,373,650 to Killpatrick discloses a dithering system in which a varying bias in the frequency is applied to at least one of the counterpropagating beams. The varying bias causes a varying frequency difference between the counterpropagating beams. This frequency difference is generally greater than the frequency difference that occurs at the lock-in threshold. The polarity of the frequency difference is periodically alternated so that the time integral of the frequency difference over the time interval between sign reversals is substantially zero.

U.S. Pat. No. 4,436,423 to Kumar et al. discloses a ring laser gyroscope suspension comprising a torsional hinge axially mounted within a central bore of a ring laser gyroscope body. The hinge comprises a plurality of angularly spaced wing sections having radially extending slits for permitting torsional motion of the gyroscope about the hinge. A plurality of spaced, curved segments bridge a gap between the wing sections and and the confronting surface of the bore and are cemented thereto for securement to the hinge.

Previous ring laser gyroscope dither flexures are mounted to the frames by relatively flexible bonding agents such as polyurethane glue to absorb thermal stresses to prevent thermal fluctuations from causing problems such as changing the path length or misaligning the counterpropagating beams in the resonant cavity. Misalignment reduces the power output of the ring laser gyroscope. Changes in the path length change the resonant wavelength of the resonant cavity and the wavelength at which the lasing medium will provide gain. Changing the wavelength changes the scale factor of the ring laser gyroscope, which is undesirable during operation thereof since the accuracy of measurements provided by the ring laser gyroscope requires a known, constant scale factor.

The excessive flexibility of prior methods for mounting dither flexures in ring laser gyroscope frames increases coning errors and lowers the resonant frequency of the dither flexure assembly. Typical prior art dither flexures have resonant frequencies of about 400–700 Hz. Since the ring laser gyroscope is dithered at about 300–500 Hz about the sensor axis, the dither vibrations about one axis are transmitted to the other axes. The resonant frequencies of these prior dither flexures are sufficiently close to the dither frequency that the dither drive also causes oscillations about axes of other ring laser gyroscopes that are typically included in a guidance system.

Prior dither flexures fit in a generally cylindrical cavity in the frame, and the outer surface of the dither flexure must be precisely machined and aligned concentrically with the cylindrical cavity. A uniform space must be provided between the dither flexure and the walls of the cylindrical cavity for receiving the flexible glue. Any misalignment of the components or nonuniformity in the gap will cause stress points in the frame, and such stress points may severely diminish the performance of the ring laser gyroscope.

SUMMARY OF THE INVENTION

The present invention provides a dither flexure structure that provides improved reduction in sensitivity to vibration and coning. The dither flexure of the invention is configured for mounting in a cavity in a ring laser gyroscope frame to dither the ring laser gyroscope. The dither flexure comprises a central hub portion and a plurality of curved vanes that each have an inner end extending from the hub. An outer end of vanes projects away from the central portion, and a flexure ring is connected to the outer ends of the curved vanes. The vanes of the dither flexure of the present invention preferably include a curved portion connected to the hub and a straight portion included between the curved portion and the flexure ring.

The plurality of vanes are preferably arranged in pairs with each pair of vanes having the curved portions closely spaced at the connections thereof to the hub. The curved portions have opposite curvatures so that the straight portions of the vanes in each pair diverge as the radial distance from the central portion increases.

The dither flexure of the present invention preferably includes a pair of piezoelectric actuator elements mounted to opposite sides of the straight portions of the curved vanes. The piezoelectric drive elements have polarities such that application of drive voltages to the drive elements rotates the flexure ring about a sensing axis of the ring laser gyroscope.

The dither flexure of the present invention may also include a boss formed around a central portion of the outer periphery of the flexure ring. A support ring that preferably comprises a pair of support ring members is bonded around the flexure ring over the boss and form a pair of voids on opposite sides of the boss between the flexure ring and the support ring. The support rings have bosses thereon to be bonded to the ring laser gyroscope frame and form a third void bounded by the ring laser gyroscope frame and the first and second support rings between the first and second bosses. The ring laser gyroscope frame and the first and second support rings have substantially identical thermal expansion coefficients to prevent thermal stresses in the dither flexure from causing strains in the ring laser gyroscope frame.

The present invention may also comprise a ring laser gyroscope including a frame having a central void and a closed cavity therein, the closed cavity defining an optical path, a dither flexure positioned inside the central void, the dither flexure including an outer flexure ring, and means for mounting the dither flexure inside the central void to form a plurality of annular voids between the outer flexure ring and said frame to prevent transmission of thermal stresses and mechanical vibrations between the dither flexure and the frame to avoid distortion of the optical path.

The method of the present invention for dithering a ring laser gyroscope frame comprises the steps of extending a plurality of curved vanes from a central hub portion of a dither flexure such that each curved vane has an inner end connected to the hub and an outer end projecting away from the hub, and forming a flexure ring around the central portion connected to the outer ends of the curved vanes. The method of the present invention may also include the step of forming each of the vanes to have a curved portion connected to the central dither flexure portion and to have a straight portion between the curved portion and the flexure ring. The method of the present invention may further include the steps of arranging the plurality of vanes in pairs, forming each pair of vanes to have the curved portions closely spaced at the connections thereof to the central dither flexure portion, and forming the curved portions to have opposite curvatures so that the straight portions of the vanes in each pair of diverge as the radial distance from the central dither flexure portion increases.

The method of the present invention may further include the steps of forming a plurality of lobes extending from the central hub portion between successive pairs of the vanes, forming a bore in each of the lobes and providing a mounting bolt for placement in each bore to mount the central portion to the pedestal.

The method of the present invention preferably further includes the steps of mounting a pair of piezoelectric actuator elements to opposite sides of the straight portions of the curved vanes, forming the piezoelectric drive elements to have polarities such that application of drive voltages thereto rotates the flexure ring about a sensing axis of the ring laser gyroscope.

The method of the present invention may further include the steps of forming a boss around a portion of the outer periphery of the flexure ring and bonding a first support ring around the ring to cover a first portion of the boss and to form a first void between the flexure ring and the first support ring. The method may also include forming a first support boss on the first support ring and bonding the first support boss to the to the ring laser gyroscope frame. The method may also include placing a second support ring around the flexure ring to cover the remainder of the boss and to form a second void between the flexure ring and the support ring, forming a second support boss on the second support ring and bonding the second end bosses to the ring laser gyroscope frame.

The method of the present invention preferably further includes the step of forming the ring laser gyroscope frame and the first and second support rings to have substantially identical thermal expansion coefficients to prevent thermal stresses in the dither flexure from causing strains in the ring laser gyroscope frame.

The method of the present invention also may further include the steps of forming a central boss around a central portion of the outer periphery of the flexure ring, bonding a support ring around the flexure ring to cover the boss and form a first void and a second void between the flexure ring and the support ring, forming a first end boss on the support ring, forming a second end boss on the support ring and bonding the first and second end bosses to the ring laser gyroscope frame and forming a third void bounded by the ring laser gyroscope frame and the support ring.

The method of the present invention for forming a ring laser gyroscope comprises the steps of forming a frame to have a void and a closed cavity therein, the closed cavity defining an optical path mounting a support ring in the central void, forming a pair of support bosses at opposite ends of the support ring, bonding the bosses being to the frame inside the central void, the bosses, a central portion of the support ring and the frame cooperating to form an annular void between the frame and the central portion of the support ring. the method also includes mounting a dither flexure inside the support ring, the dither flexure including a central hub portion, an outer flexure ring and a plurality of vanes extending between the central hub portion and the outer flexure ring, forming a flexure boss around the outer periphery of the outer flexure ring and bonding the boss being to the support ring, the flexure boss, the support ring and the support bosses cooperating to prevent transmission of thermal stresses and mechanical vibrations between said dither flexure and the frame to avoid distortion of the optical path.

The method of the present invention for forming a ring laser gyroscope also comprises the steps of forming a frame having a central void and a closed cavity therein, the closed cavity defining an optical path, placing a dither flexure including an outer flexure ring inside the central void and mounting the dither flexure inside the central void to form a plurality of annular voids between the outer flexure ring and the frame to prevent transmission of thermal stresses and mechanical vibrations between the dither flexure and said frame to avoid distortion of the optical path.

The dither flexure and method of the present invention are described with reference to a ring laser gyroscope having a rectangular path for the counterpropagating light beams, but the invention is not limited to this particular path configuration. In particular, the present invention is also applicable to ring laser gyroscopes having triangular paths.

DESCRIPTION OF THE PREFERRED EMBODIMENT

Figure 1:
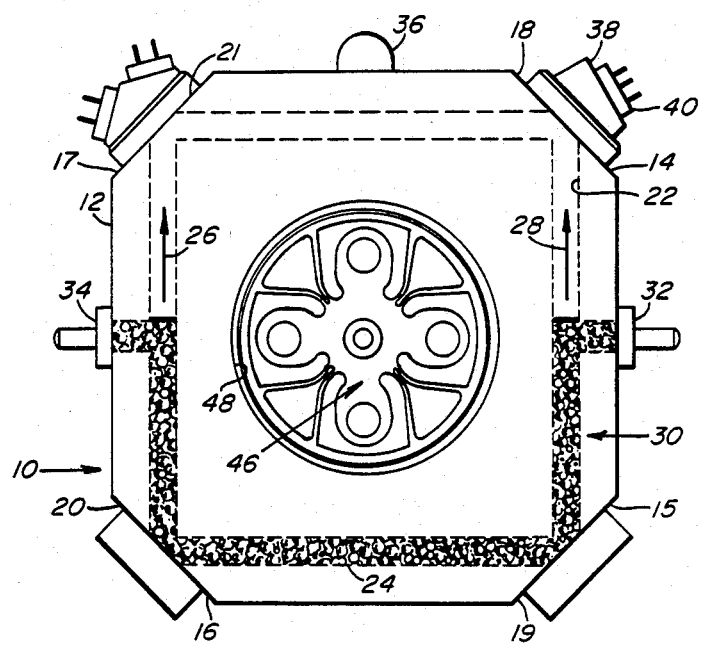
FIG. 1 is a plan view of a ring laser gyroscope showing a frame structure mounted on a curved blade dither flexure according to the present invention.

Referring to FIG. 1, a ring laser gyroscope 10 includes a frame 12 that has a generally rectangular shape with the corners cut off to form four mounting faces 14–17. A plurality of mirrors 18–21 are mounted on the mounting faces 14–17, respectively. A cavity 22 is formed in the frame 12 to form a path around the frame 12 between the mirrors 18–21.

A lasing medium 24 is positioned in the cavity 22 to produce counterpropagating light beams 26 and 28 therein. The lasing medium is typically a mixture of helium and neon confined to a region 30 of the cavity 22. Energy is delivered to the lasing medium 24 by a power supply (not shown) which applies voltage to a pair of anodes 32 and 34 and to a cathode 36. Other structures may be used for the ring laser gyroscope 10. A basic description of the ring laser gyroscope 10 is presented by way of example and not for limitation of the present invention to a particular ring laser gyroscope structure.

One of the mirrors, for example the mirror 18 is partly transmissive so that a portion of each beam enters a prism 38 mounted to the back of the mirror 18. The prism 38 is formed to combine the counterpropagating beams so that they interfere with one another before impinging upon a photodetector 40.

The two counterpropagating beams undergo phase shifts in circulating around the cavity 22 by successive reflection from the mirror 18–21 as the cavity 22 rotates about its longitudinal axis 42. The difference in the phase of the two counterpropagating beams is indicative of the rotation rate of the cavity 22 about the longitudinal axis 42. Since the cavity 22 acts as a resonant cavity to the two beams, the frequency of each beam is sharply defined so that the phase shifts are detectable.

Figure 7:
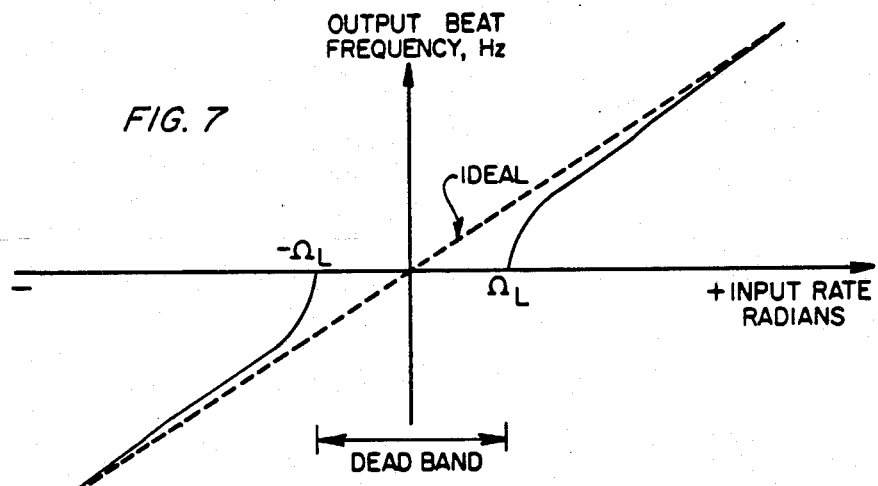
FIG. 7 graphically illustrates the output beat frequency of a ring laser gyroscope as a of rotation rate.

The two frequencies heterodyne and form a beat signal whose frequency is directly proportional to the rotation rate of the ring laser gyroscope 10 about its longitudinal axis 42. Referring to FIG. 7, when the rotation rate of a simple, unbiased ring laser gyroscope is reduced to the lock-in threshold rate $\Omega_L$, the counterpropagating beams lock at the same frequency. The frequencies of the counterpropagating beams are the same for a range of rotation rates $\pm \Omega_L$, which is the lock-in deadband shown in FIG. 7. Referring to FIG. 7, the signal output from the ring laser gyroscope 10 becomes non-linear in the vicinity of the deadband, which is a departure from the output of an ideal ring laser gyroscope.

Figure 8:
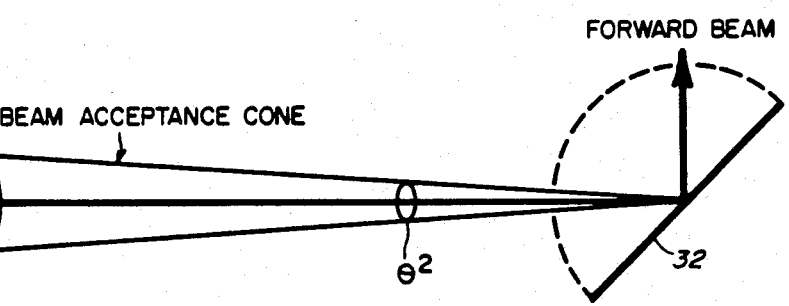
FIG. 8 illustrates forward reflected and backscattered light from a mirror of the type that may be included in the ring laser gyroscope of FIG. 1.

Referring to FIG. 8, lock-in is believed to be caused primarily by radiation backscattered from the mirrors 18–21. Since the counterpropagating beams strike each of the mirrors 18–21 at an angle of incidence of 45°, there would be no backscattered radiation from ideal, perfectly flat mirrors. A main portion 43 of each beam is forward reflected from the mirror 18, for example, according to the laws of reflection. However, even though the mirrors 18–21 are of very high quality, surface imperfections cause some specular reflection of each beam in all directions. A portion 44 of light from one beam that is backscattered into an acceptance solid angle for the oppositely directed beam couples thereto. The acceptance solid angle depends upon the wavelength of the light and the diameter of the cavity 22. For a typical square ring laser gyroscope 10 having a 45° angle of incidence, about one part in $10^6$ of the total specular reflection from any one of the mirrors 18–21 is scattered into the acceptance angle of the counterpropagating beam.

Figure 9A:
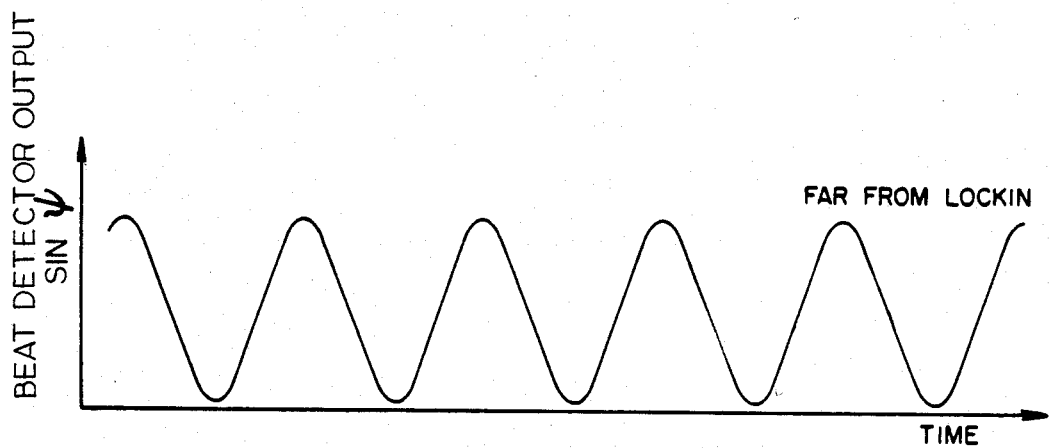
FIGS. 9A and 9B illustrate the output waveform of the ring laser gyroscope of FIG. 1 for rotation rates far from the lock-in threshold and near the lock-in threshold, respectively.
Figure 9B:
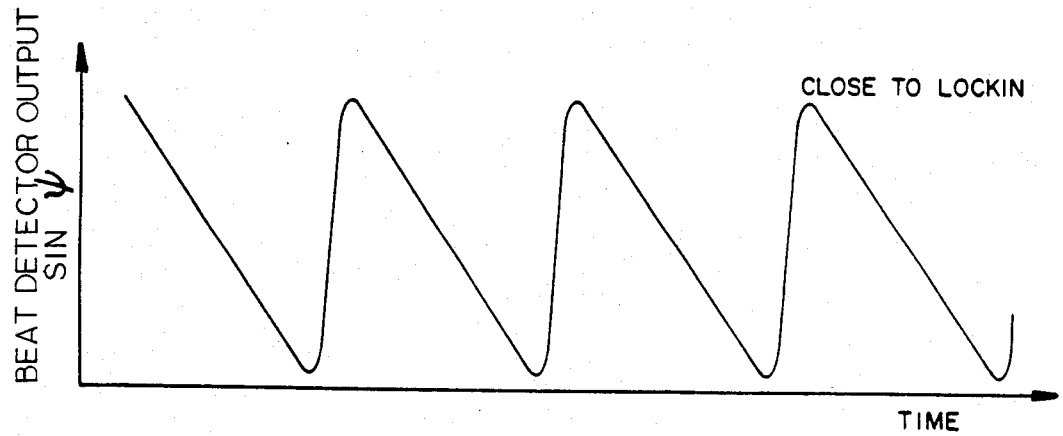

Referring to FIG. 9A, the output of the detector 40 as a function of time is sinusoidal when the rotation rate is far from the lockin threshold. Referring to FIG. 9B, when the rotation rate is near the lock-in threshold, the output of the detector 40 is distorted from the desired sinusoidal waveform. For a typical ring laser gyroscope having a cavity length of 49 cm, the lock-in threshold is about 100°/hr. Therefore, obtaining satisfactory results from the ring laser gyroscope 10 requires avoidance not only of lock-in but also avoidance of the rotation rates near the deadband.

The ring laser gyroscope 10 includes a dither flexure 46 mounted in a central passage 48 in the frame 12. There are stringent requirements that the dither flexure 46 must satisfy. The dither flexure 46 must transmit essentially no thermal stresses to the frame 12 to avoid misalignment of the cavity 22 and distortions of the optical path length of the cavity 22 for the coounter-propagating beams.

Figure 2:
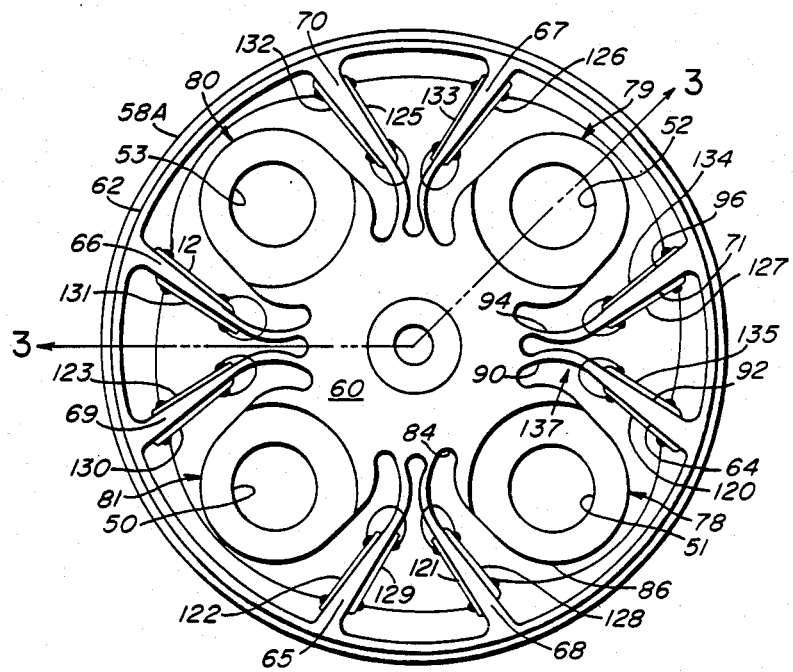
FIG. 2 is a plan view of the dither flexure of FIG. 1 and a support ring used to support the ring laser gyroscope frame upon the dither flexure of the present invention.
Figure 6:
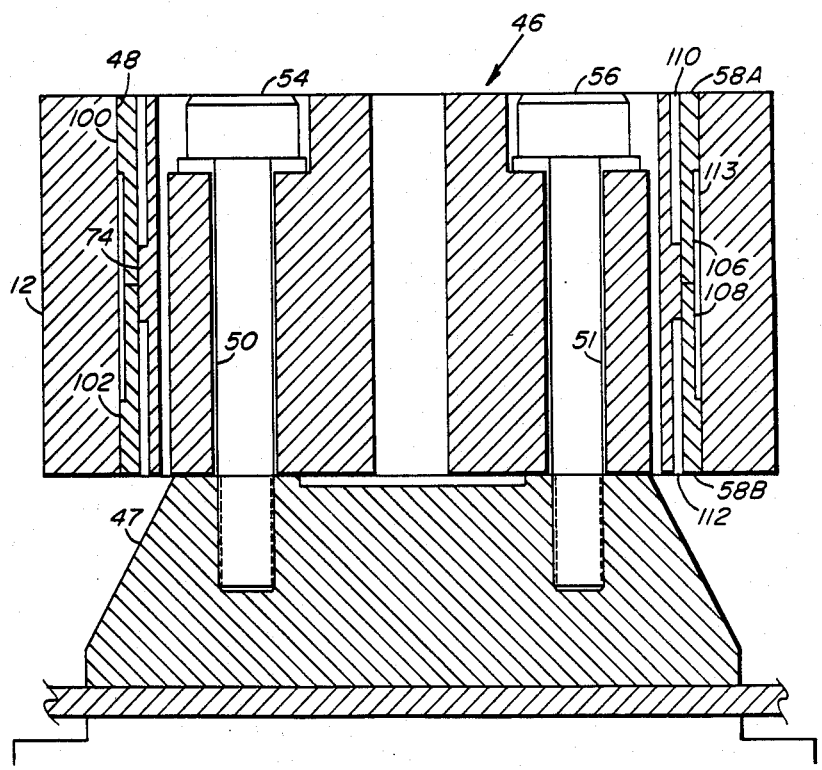
FIG. 6 is a cross sectional view showing the dither flexure of the present invention mounted on a pedestal.

To minimize errors due to lock-in, the frame 12 of the ring laser gyroscope 10 is oscillated relative to a pedestal 47 shown in FIG. 6. Referring to FIGS. 2 and 6, the frame 12 is mounted to a dither flexure 46. The dither flexure 46 includes a plurality of bores 50-53 therein for receiving fasteners such as flexure mounting bolts 54 and 56 shown in FIG. 6 in the bores 50 and 51 for connecting the frame 12 to the pedestal 47. Flexure mounting bolts (not shown) also are placed in the bores 52 and 53 when the dither flexure 46 is mounted to the pedestal 47.

Figure 5:
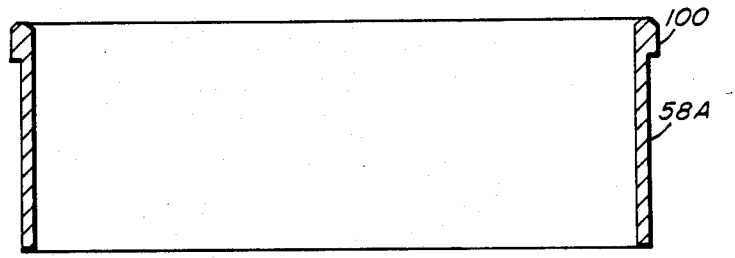
FIG. 5 is a cross sectional view of the support ring of FIGS. 2 and 4.

Referring to FIGS. 2, 5 and 6, a pair of cylinders 58A and 58B, which are preferably formed of a glass ceramic material having the same thermal expansion coefficient as frame 12 are placed between the dither flexure 46 and the frame 12. The glass ceramic cylinders 58A and 58B are substantially identical; therefore, only the cylinder 58A is shown in FIG. 5. The length and thickness of the glass ceramic cylinders 58A and 58B are designed to provide stress absorption in order to prevent thermal mismatch between the dither flexure 46 and the frame 12 from distorting the body. The dither flexure 46 is typically formed of an alloy known as super invar, and the frame 12 is formed of a glass ceramic material.

Avoidance of strain at the interface between the glass ceramic cylinders 58A and 58B and the frame 12 is critical to laser cavity alignment. Calculations and tests have shown that the glass ceramic cylinders 58A and 58B reduce stresses on the frame 12 an order of magnitude below previous designs. The dither flexure 46 expands when the temperature increases, but the glass ceramic cylinders 58A and 58B absorb over 99% of thermal stress associated with thermal expansion and contraction of the dither flexure 46.

Referring to FIG. 2, the dither flexure 46 includes a central portion 60 and an outer ring 62 connected by a plurality of blades or vanes. The illustrated exemplary preferred embodiment includes eight blades 64-71, but the invention is not limited to the number of blades illustrated. In a preferred embodiment of the invention designed for use with a ring laser gyroscope 10 having the cavity 22 formed to provide a 28 cm path length for the counterpropagating beams, the outer ring 62 has an inside diameter of about 1.595 in. and a thickness of about 0.35 in. A boss 74 is formed on a central outer portion of the outer ring 62. The outer diameter of the outer ring 62 at the boss 74 is about 1.7 in. The length of the cylinder 58 is preferably about 1.2 in, and the length of the boss 74 is about 0.4 in or less.

The bores 50-53 are preferably formed in lobes 78-81 that project radially outward from the central portion. The bores 50-53 are preferably arranged so that their longitudinal axes are spaced apart by 45° around the central portion. The lobes are substantially identical; therefore, only the lobe 78 is described in detail herein. Referring to FIG. 2, the lobe 78 has a neck 84 having a width of about 0.3 in. The neck widens along a pair of smooth arcs to form the body of the lobe to have a maximum width of about 0.4 in. The lobe 78 terminates in a generally semicylindrical portion 86 having a radius of about 0.2 in. The bore 51 is formed to be concentric with the arc of curvature of the semicylindrical portion 86 and has a radius of about 0.076 in.

The blades 64-71 extend from the central portion of the dither flexure 46 with a pair of blades being between adjacent lobes. For example, blades 64 and 71 extend between lobes 78 and 79 to the outer ring 62. The blades 64-67 are substantially identical and the blades 68-71 are substantially identical to each other; therefore, only the blades 64 and 71 are described in detail herein. Reference is made to other blades when necessary to clarify the structure of the present invention.

Referring to FIG. 2, the blade 64 has a clockwise curved portion 90 that projects from the central portion of the dither flexure 46. The curved portion 90 preferably has a thickness of about 0.041 in. and a radius of curvature of about 0.187 in. A straight portion 92 extends from the curved portion 90 to the outer ring 62 with the length of the straight portion being about 0.25 in. The angle between the juncture of the straight portion 92 and the radius of the dither flexure 46 that bisects the angle between the blades 64 and 71 is about 38.

The blade 71 has a counterclockwise curved portion 94 that projects from the central portion of the dither flexure 46. The radius of curvature and arc length of the curved portion 94 are substantially identical to those of the curved portion 90 of the blade 64. A straight blade portion 96 extends from the curved portion 94 to the outer ring 62. The arc length of the outer ring 62 between the junctures of the straight portions 92 and 96 is about 1.0 in along the inside diameter of the outer ring 62.

Figure 3:
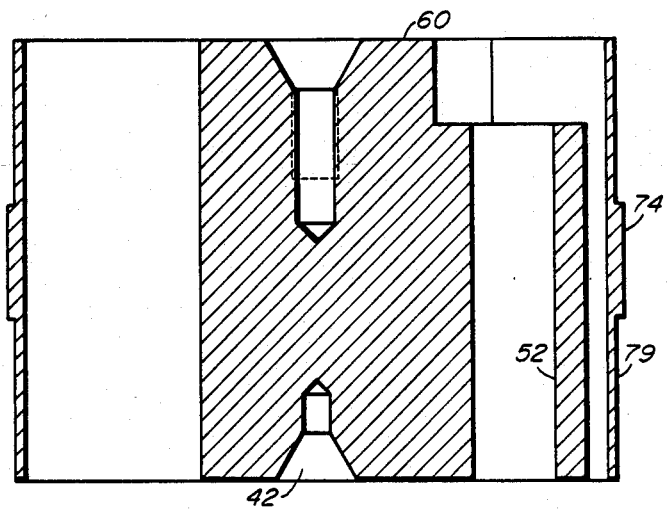
FIG. 3 is a cross sectional view taken along line 3—3 of FIG. 2 showing a bore in a lobe of a central portion of the dither flexure and showing a boss formed on an outer ring portion of the dither flexure of FIG. 2.
Figure 4:
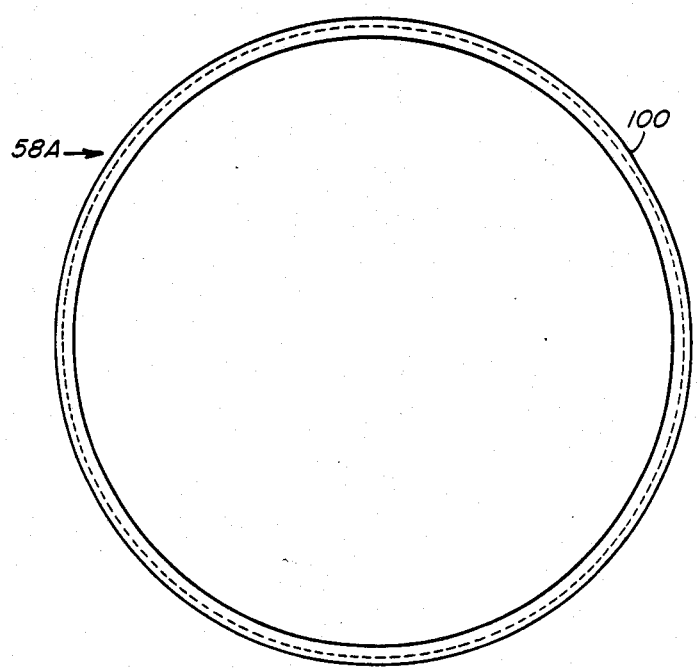
FIG. 4 is a plan view showing the support ring of FIG. 2 in an expanded scale.

Referring to FIGS. 3 and 6, the length of the lobe 79 is preferably shorter at the semicylindrical portion than at the neck so that the head of the bolt placed in the bore does not project beyond a region bounded by the neck and the outer ring 62. The bolts project into the pedestal a distance sufficient to securely mount the dither flexure 46 thereto.

Referring to FIGS. 2, 4-6, the glass ceramic cylinder 58A preferably has an inside diameter of about 1.69 in. and and outer diameter of about 1.76 in. A boss extending around an end 100 of the glass ceramic cylinder 58A has an outside diameter of about 1.796 in. A boss 102 substantially identical to the boss 100 extends around an end 104 of the glass ceramic cylinder 58B. The glass ceramic cylinders 58A and 58B are mounted on the outer ring 62 with the bosses 100 and 102 being adjacent opposite ends of the dither flexure 46.

As shown in FIG. 6, the glass ceramic cylinders 58A and 58B touch the outer ring 62 of the dither flexure 46 only where the boss 74 on the outer ring 62 contacts the inside diameter of a pair of end portions 106 and 108 of the of the glass ceramic cylinders 58A and 58B, respectively. A bonding agent secures the metal dither flexure 46 to the glass ceramic cylinders 58A and 58B. The glass ceramic cylinders 58A and 58 B fit inside the circular cavity 48 in the frame 12 with only the bosses 100 and 102 of the glass ceramic cylinders 58A and 58B, respectively, being in contact with the glass material of the frame 12. Therefore in the ring laser gyroscope 10 there is no contact between the metal dither flexure 46 and the glass material of the frame 12, which prevents thermal dimensional changes of the dither flexure 46 from having any appreciable effect on the frame 12.

The bonding agnet used to bond the dither flexure 46 to the glass ceramic cylinder 58 and to bond the glass ceramic cylinder 58 to the frame 12 may be of a type that cures to become rigid. Previous bonding agents such as polyurethane used to bond dither flexures (not shown) to the ring laser gyroscope frame had to be relatively flexible to absorb thermal stresses to prevent thermal fluctuations from causing problems such as changing the path length or misaligning the counterpropagating beams in the cavity 22. Misalignment reduces the power output of the ring laser gyroscope 10. Changes in the path length change the resonant wavelength of the cavity 22 and change the wavelength at which the lasing medium will provide gain. Changing the wavelength changes the scale factor of the ring laser gyroscope, which is undesirable during operation thereof since the accuracy of measurements provided by the ring laser gyroscope require a known, constant scale factor.

Prior methods for mounting dither flexures in ring laser gyroscope frames had the disadvantage of allowing too much flexibility, which increased coning errors and lowered the resonant frequency of the dither flexure assembly for oscillations about axes other than the sensor axis. Typical prior art the dither flexure have off-axis resonant frequencies of about 600 Hz. The dither flexure 46, being substantially more rigid than prior structures, has an off-axis resonant frequency of about 1500 Hz. Earlier dither flexures had input axis sag greater than one arc-sec/g. The dither flexure 46 of the present invention provides an input axis sag less than 0.2 arc-sec/g.

The dither flexure 46 provides significant advantages over prior dither flexures in ease of manufacture and performance. Referring to FIG. 6, the only contact between the dither flexure 46 and the glass ceramic cylinders 58A and 58B is at the juncture of the boss 74 and the ends 106 and 108 of the glass ceramic cylinders 58A and 58B, respectively. The region between the outer ring 62 and the glass ceramic cylinders 58A and 58B defines a pair of annular voids 110 and 112. The glass ceramic cylinders 58A and 58B and the frame 12 enclose a void 113 that extends between the bosses 100 and 102. The void 113 is opposite the boss 74 so that there is no direct path for transference of thermal stress or radially directed mechanical vibrations between the dither flexure 46 and the frame 12. Essentially no energy transfers between the outer ring 62 and the glass ceramic cylinders 58A and 58B across the voids 110 and 112 or between the glass ceramic cylinders 58A and 58B and the frame 12 across the void 113. Thermal stresses are absorbed by the glass ceramic cylinders 58A and 58B, which expand into the void 113 as the dither flexure 46 expands upon an increase in temperature. The result of thermal expansion of the dither flexure if a slight bending of the glass ceramic cylinders 58A and 58B toward the frame 12. If the temperature of the dither flexure 46 decreases so that the dither flexure 46 contracts, then the glass ceramic cylinders 58A and 58B bend inwardly away from the frame 12.

Prior dither flexure assemblies do not include the glass ceramic cylinders 58A and 58B and do not have the boss 74 on the periphery of the outer ring 62. The cavity in the frame in which the prior the dither flexures fit and the outer surface of the dither flexure had to be precisely machined and concentrically aligned to have a uniform space therebetween for receiving the flexible polyurethane adhesive. Any misalignment of the components or nonuniformity in the gap will cause stress points in the frame, and such stress points may severely diminish the performance of the ring laser gyroscope.

The ring laser gyroscope 10 including the dither flexure 46 and the glass ceramic cylinders 58A and 58B does not encounter the difficulty of prior the ring laser gyroscopes because there is only a controlled small area of contact between the glass ceramic cylinders 58A and 58B and the frame 12. The material where such contact occurs has the same coefficient of thermal expansion as the frame 12 and absorbs other stresses to prevent thermal and mechanical stresses from being transmitted from the dither flexure 46 to the frame 12.

Figure 10:
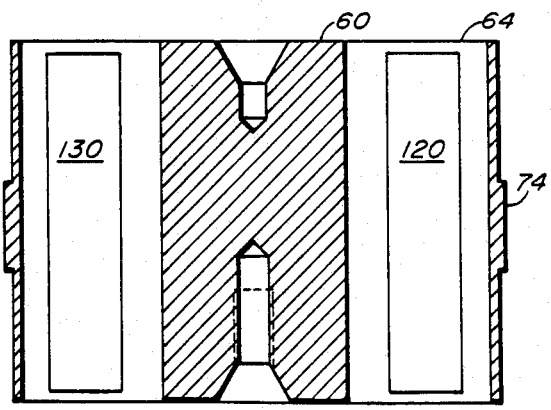
FIG. 10 is a cross sectional view taken along line 10—10 of FIG. 2 showing piezoelectric drivers mounted to blades of the dither flexure of the present invention.

Referring to FIGS. 2 and 10, the dither flexure 46 includes means for oscillating the frame 12 about longitudinal axis 42. In the preferred embodiment illustrated a plurality of piezoelectric drive elements 120-135 are mounted to the blades 64-71. The piezoelectric drive elements are mounted to the blades 64-71 in pairs so that each blade has two piezoelectric drive elements mounted thereon as shown in FIG. 2. Since the piezoelectric drive elements 120-135 are all mounted in essentially the same manner, only the piezoelectric drive elements 120 and 130 that are mounted to the blades 64 and 69 are described in detail herein.

As can be seen from FIGS. 2 and 10, the piezoelectric drive elements 120-135 are thinner than the blades 64-71 and have generally rectangular shapes. The piezoelectric drive element 120, for example, is mounted on the straight portion 92 of the blade 64 on a flat surface 95 thereof. The piezoelectric drive element 120 is entirely on one side of an inflection point, which is at the juncture of the curved portion and the straight portion. Since adjacent blades are relatively far apart between the straight portions, there is adequate space for installing the piezoelectric drive elements 120-135. The piezoelectric drive element 135 is mounted on the blade 64 opposite the piezoelectric drive element 120. The piezoelectric drive element 120 is poled oppositely to the piezoelectric drive element 135 such that application of a drive voltage thereto causes a first side of the blade to radially contract while the other side radially expands. The piezoelectric drive elements have alternating polarities.

Referring to FIG. 2, if all of the piezoelectric drive elements 120-127 cause contraction while all of the piezoelectric drive elements 128-135 cause expansion, the result will be a counterclockwise rotation of the outer ring 62 about the longitudinal axis 42. Reversal of the drive voltage causes a clockwise rotation of the outer ring 62 about the longitudinal axis 42. The rotations of the outer ring 62 are typically about ±150 arc sec. when the piezoelectric drive elements are driven by a power source (not shown) at a frequency of 400 Hz and a voltage of ±50 volts.

What is claimed is:

1. A dither flexure for a ring laser gyroscope formed in a frame having a mounting cavity therein, comprising:
   a central hub portion having a longitudinal axis;
   a plurality of curved vanes each having an inner end connected to said central hub portion and having an outer end projecting away from said central portion;

a flexure ring around said central hub portion connected to said outer ends of said curved vanes;

a flexure boss formed around a central portion of the outer periphery of said flexure ring;

a generally cylindrical support ring surrounding said flexure ring, the central portion of said support ring being bonded to said flexure boss forming a first void and a second void between said flexure ring and said support ring, a first support boss formed on said support ring, said first support boss facing radially outward from said support ring adjacent a first end thereof; and a second support boss formed on said support ring adjacent a second end thereof, said second support boss facing radially outward from a second end of said support ring, the first and second end bosses being configured for bonding to the frame inside the mounting cavity therein and forming a third void bounded by the ring laser gyroscope frame and said support ring.

2. The dither flexure of claim 1 wherein each of said vanes has a curved vane portion connected to said central hub portion and a straight vane portion formed between said curved vane portion and said flexure ring.

3. The dither flexure of claim 2 wherein said plurality of vanes are arranged in pairs with the curved vane portions in each pair of vanes having opposite curvatures.

4. The dither flexure of claim 3, further comprising:
a lobe extending generally radially from said central hub portion between successive pairs of said vanes, each of said lobes having a bore therein; and
a mounting bolt for placement in each bore to mount said central hub portion to the pedestal.

5. The dither flexure of claim 1 wherein each of said vanes has a curved vane portion connected to said central hub portion and a straight vane portion formed between said curved vane portion and said flexure ring.

6. The dither flexure of claim 5 wherein said plurality of vanes are arranged in pairs, the curved vane portions in each pair of vanes having opposite curvatures.

7. The dither flexure of claim 6, further including:
a lobe extending generally radially from said central hub portion between successive pairs of said vanes, each of said lobes having a bore therein; and
a mounting bolt for placement in each bore to mount said central hub portion to the pedestal.

8. The dither flexure of claim 5, further including actuator means mounted to said straight portions of said curved vanes for oscillating said flexure ring about said longitudinal axis.

9. The dither flexure of claim 8 wherein said actuator means comprises:
a pair of piezoelectric actuator elements mounted on opposite sides of each of said vanes; and
means for applying drive voltages to said piezoelectric actuator elements, said piezoelectric actuator elements having polarities such that application of drive voltages thereto oscillates said flexure ring about said longitudinal axis.

10. A dither flexure for a ring laser gyroscope formed in a frame having a mounting cavity therein, comprising:
a central hub portion having a longitudinal axis;
a plurality of curved vanes each having an inner end connected to said central hub portion and having an outer end projecting away from said central portion;

a flexure ring around said central hub portion connected to said outer ends of said curved vanes;

a flexure boss formed around and extending outward from a central portion of the outer periphery of said flexure ring;

a first support ring formed generally as a cylinder and placed around a first portion of said flexure ring with a first portion of an inner side of the first support ring bonded to a first portion of said flexure boss to form a first void between said flexure ring and a second portion of the inner side of said first support ring;

a first radially outwardly facing support boss formed on an outer side portion of said first support ring;

a second support ring formed generally as a cylinder and placed around a second portion of said flexure ring with a first portion of an inner side of the second support ring bonded to a second portion of said flexure boss to form a second void between said flexure ring and a second portion of the inner side of said second support ring; and a second radially outwardly facing support boss formed on an outer side portion of said second support ring said first and second support bosses being configured for bonding to the frame inside the mounting cavity therein and forming a third void bounded by the ring laser gyroscope frame and portions of the outer sides of said first and second support rings between said first and support second bosses.

11. The dither flexure of claim 10 wherein the ring laser gyroscope frame and said first and second support rings and support bosses have substantially identical thermal expansion coefficients to prevent thermal stresses in said dither flexure from causing strains in said ring laser gyroscope frame.

12. The dither flexure of claim 10 wherein each of said vanes has a curved vane portion connected to said central hub portion and a straight vane portion formed between said curved vane portion and said flexure ring.

13. The dither flexure of claim 12 wherein said plurality of vanes are arranged in pairs, the curved vane portions in each pair of vanes having opposite curvatures.

14. The dither flexure of claim 13 further comprising:
a lobe extending generally radially from said central hub portion between successive pairs of said vanes, each of said lobes having a bore therein; and
a mounting bolt for placement in each bore to mount said central hub portion to the pedestal.

15. The dither flexure of claim 10, further including actuator means mounted to said straight portions of said curved vanes for oscillating said flexure ring about said longitudinal axis.

16. The dither flexure of claim 15 wherein said actuator means comprises:
a pair of piezoelectric actuator elements mounted on opposite sides of each of said vanes; and
means for applying drive voltages to said piezoelectric actuator elements, said piezoelectric actuator elements having polarities such that application of drive voltages thereto oscillates said flexure ring about said longitudinal axis.

17. A ring laser gyroscope, comprising:
a frame having a cavity therein;
a generally cylindrical support ring mounted to the frame inside said cavity, said support ring having a pair of support bosses around opposite ends thereof and extending radially outward therefrom toward said frame such that said support bosses, said support ring and said frame cooperate to form an annular void between said frame and said support ring;

a dither flexure mounted inside said support ring, said dither flexure including a central hub portion, a flexure ring and a plurality of vanes extending between said central hub portion and said flexure ring; and a flexure boss formed around the outer periphery of said flexure ring, said flexure boss extending from a central portion of said flexure ring, said flexure boss and said support ring cooperating to form a second annular void and a third annular void between said flexure ring and said support ring.

18. The ring laser gyroscope of claim 17, further including:

first bonding means for bonding said flexure boss to said support ring; and second bonding means for bonding said support bosses to said frame.

19. The ring laser gyroscope of claim 18 wherein said first and second bonding means, said flexure boss and said support bosses cooperate to reduce transmission of thermal stresses and mechanical vibrations between said dither flexure and said frame.

20. The ring laser gyroscope of claim 19 wherein said support ring comprises a pair of support ring members, each said support ring member being formed generally as a cylinder and having an outward facing support boss thereon.

21. A ring laser gyroscope, comprising:

a frame having a cavity therein;

a dither flexure mounted to said frame inside said cavity, said dither flexure including an outer flexure ring; and means for mounting said dither flexure to said frame to form a plurality of annular voids between said outer flexure ring and said frame.

22. The ring laser gyroscope of claim 21 wherein said mounting means includes:

a flexure boss formed around an outer peripheral portion of said flexure ring;

a support ring placed between said flexure boss and said frame to form at least one annular void between said support ring and said flexure ring;

a pair of support bosses formed on opposite ends of said support ring and extending radially outward therefrom to form an annular void bounded by said support bosses, said frame and said support ring.

23. The ring laser gyroscope of claim 22 wherein said support ring comprises a pair of support ring members, each said support ring member being formed generally as a cylinder and having an outward facing support boss thereon.

24. A method for dithering a ring laser gyroscope to reduce mode locking, comprising the steps of:

extending a plurality of vanes from a central hub portion of a dither flexure such that each vane has an inner end connected to the central hub portion and an outer end projecting away from said central hub portion; and forming a flexure ring around said central hub portion connected to said outer ends of said vanes;

forming each of said vanes to have a curved vane portion connected to said central dither flexure portion and a straight portion connected between said curved portion and said flexure ring;

arranging said plurality of vanes in pairs;

forming each pair of vanes to have their curved portions closely spaced at the connections thereof to the central dither flexure portion; and forming the curved portions in each pair to have opposite curvatures so that the straight portions of the vanes in each pair diverge as the radial distance from the central dither flexure portion increases;

forming a flexure boss around a portion of the outer periphery of said flexure ring;

bonding a support ring around said flexure ring to cover said boss and form a first void and a second void between said flexure ring and said support ring;

forming a first support boss on said support ring;

forming a second support boss on said support ring; and bonding said first and second end bosses to the ring laser gyroscope frame to form a third void bounded by the ring laser gyroscope frame and said support ring.

25. A method for dithering a ring laser gyroscope to reduce mode locking, comprising the steps of:

extending a plurality of vanes from a central hub portion of a dither flexure such that each vane has an inner end connected to the central hub portion and an outer end projecting away from said central hub portion; and forming a flexure ring around said central hub portion connected to said outer ends of said vanes;

forming a flexure boss around and extending radially outwardly from a central portion of the outer periphery of said flexure ring;

placing a first portion of an inner side of a first generally cylindrical support ring on said flexure ring around a first portion of said flexure boss to form a first void between said flexure ring and said support ring on one side of the flexure boss;

forming a first radially outwardly facing support boss on on an outer surface of said first support ring;

placing a first portion of an inner side of a second generally cylindrical support ring on said flexure ring around a second portion of said flexure boss to form a second void between said flexure ring and said support ring on the other side of the flexure boss;

forming a second radially outwardly facing support boss on an outer surface of said second support ring; and placing said first and second support rings inside a cavity in a ring laser gyroscope frame such that said support bosses and the ring laser gyroscope frame from a third void bounded by the ring laser gyroscope frame and said first and second support rings between said first and second bosses.

26. The method of claim 25 further including the step of forming the ring laser gyroscope frame and said first and second support rings and support bosses to have substantially identical thermal expansion coefficients to prevent thermal stresses in said dither flexure from causing strains in said ring laser gyroscope frame.

27. A method for forming a ring laser gyroscope, comprising the steps of:

forming a frame to have a cavity therein;

mounting a support ring to the frame in said cavity;

forming a pair of radially outward extending support bosses on an outer surface of said support ring adjacent opposite end portions thereof;

bonding said support bosses to said frame inside said cavity, said bosses, a portion of said support ring and said frame cooperating to form an annular void between said frame and said support ring;

mounting a dither flexure inside said support ring, said dither flexure including a central hub portion, an outer flexure ring and a plurality of vanes extending between said central hub portion and said outer flexure ring;

forming a flexure boss around and extending radially outward from the outer periphery of said outer flexure ring; and bonding said flexure boss to said support ring, said flexure boss, said support ring and said support bosses cooperating to reduce transmission of thermal stresses and mechanical vibrations between said dither flexure and said frame.

28. The method of claim 27, further including the steps of:

forming said support ring as two support ring members; and forming one of said support bosses on each said support ring member.

29. A method for forming a ring laser gyroscope, comprising the steps of:

forming a frame having a central cavity and a closed cavity therein, said closed cavity defining an optical path;

forming a dither flexure to include an outer flexure ring; and mounting said dither flexure to said frame inside said central cavity to form a plurality of annular voids between said outer flexure ring and said frame to reduce transmission of thermal stresses and mechanical vibrations between said dither flexure and said frame to avoid distortion of said optical path.

30. The method of claim 29, including the steps of:

forming a boss around and extending radially outward from a portion of said flexure ring;

mounting a support ring to said boss to form at least one annular void between said support ring and said flexure ring; and forming a pair of support bosses on opposite end portions of said support ring extending radially outward therefrom for bonding to said frame to create an annular void between said support bosses, said frame and said support ring.

* * * * *